Dec. 12, 1961 — G. R. FRYER — 3,012,497
MACHINE FOR TYING WIRE BINDING LOOPS ABOUT VARIOUS ARTICLES
Filed Feb. 12, 1958 — 5 Sheets-Sheet 1

INVENTOR
George R. Fryer
BY Rockwell + Bartholow
ATTORNEYS

INVENTOR
George R. Fryer
Rockwell + Bartholow
ATTORNEYS

Dec. 12, 1961 G. R. FRYER 3,012,497
MACHINE FOR TYING WIRE BINDING LOOPS ABOUT VARIOUS ARTICLES
Filed Feb. 12, 1958 5 Sheets-Sheet 4
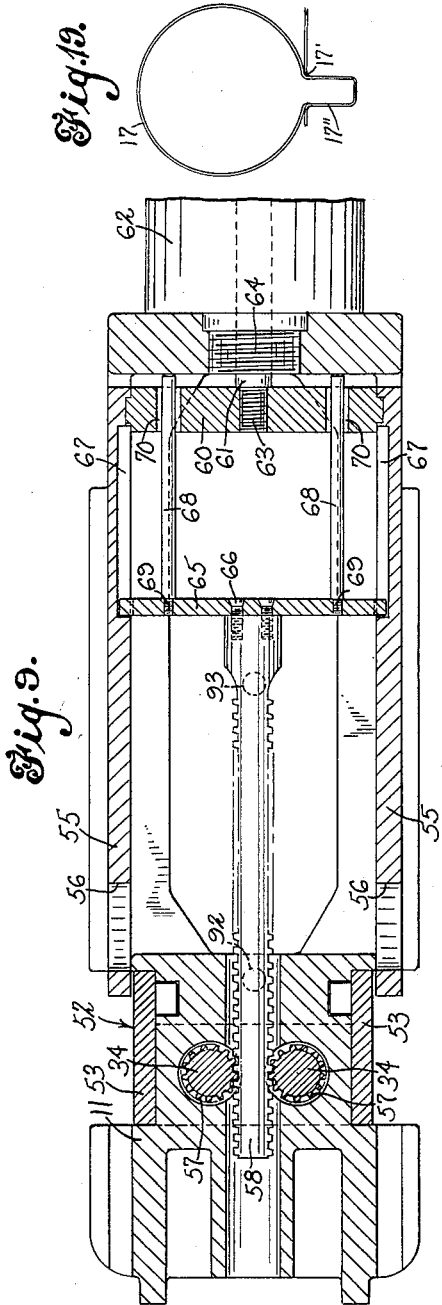
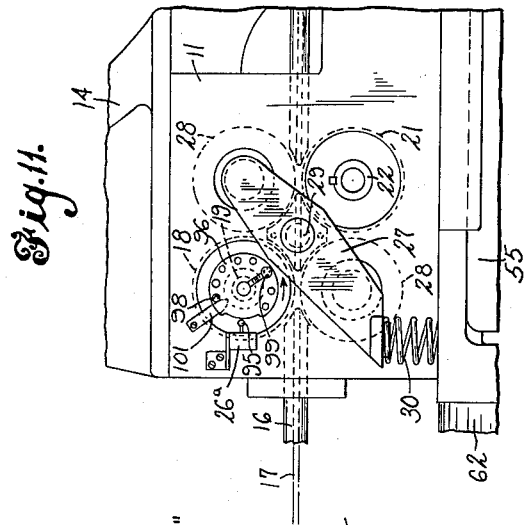
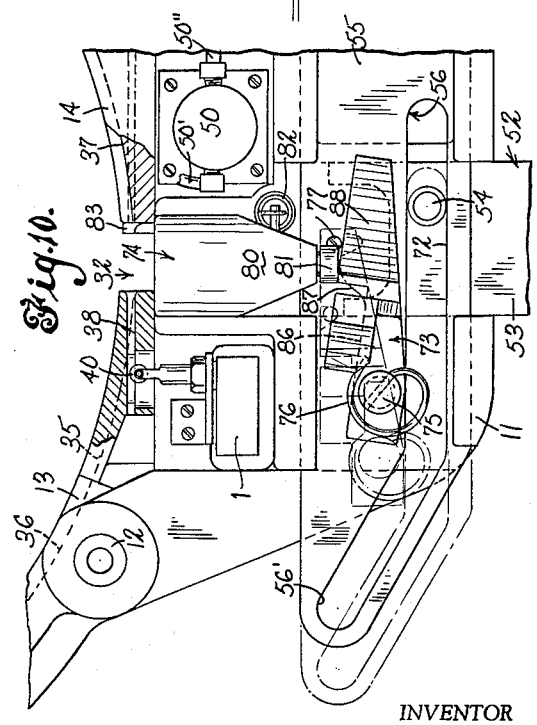
INVENTOR
George R. Fryer
BY Rockwell & Bartholow
ATTORNEYS Dec. 12, 1961 G. R. FRYER 3,012,497
MACHINE FOR TYING WIRE BINDING LOOPS ABOUT VARIOUS ARTICLES
Filed Feb. 12, 1958 5 Sheets-Sheet 5
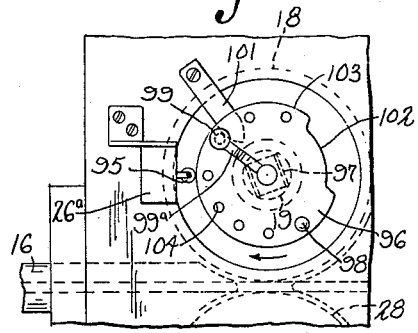
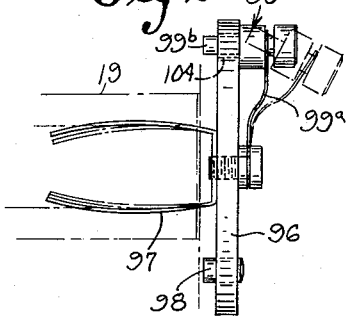
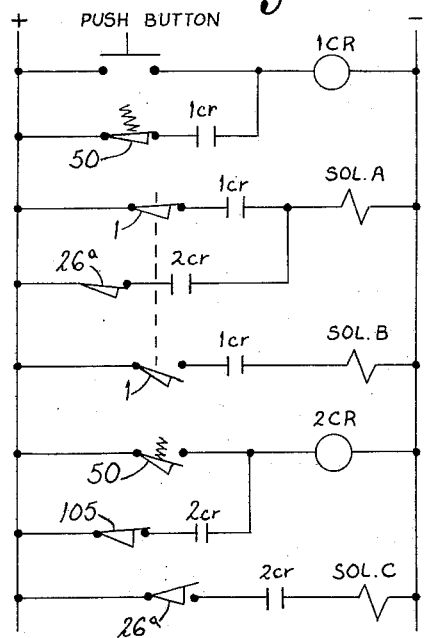
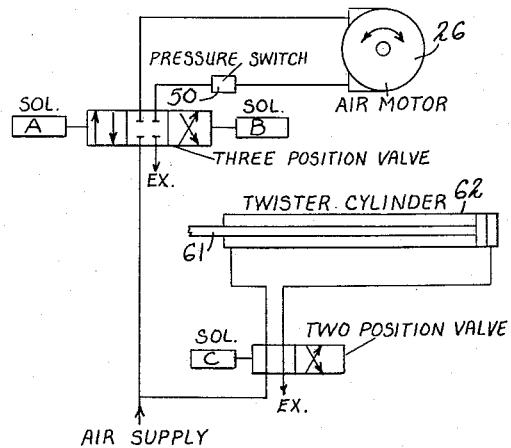
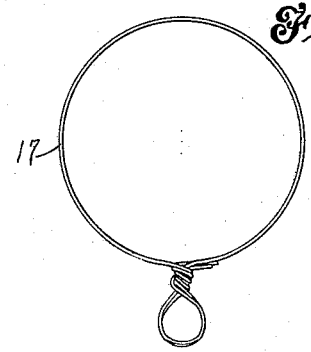
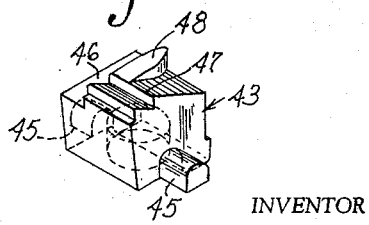
INVENTOR
George R. Fryer
BY Rockwell & Bartholow
ATTORNEYS United States Patent Office 3,012,497
Patented Dec. 12, 1961

3,012,497
MACHINE FOR TYING WIRE BINDING
LOOPS ABOUT VARIOUS ARTICLES
George R. Fryer, 2 W. Brooks St., Ansonia, Conn.
Filed Feb. 12, 1958, Ser. No. 714,887
11 Claims. (Cl. 100—26)

This invention relates to a wire-tying machine, and relates more particularly to a machine for tying a length of wire around bundles of rods, pipe, wood, wire and other articles.

One object of the invention is to provide an improved wire-tying machine and a machine which is portable and which may be easily transported from place to place.

Another object of the invention is to provide a wire-tying machine which may be mounted in a number of positions and which effects a plurality of simultaneous wire ties.

A further object is to provide a machine which effects a wire wrap or tie in which the twisted end portions thereof are looped so as not to catch on hands or foreign articles during handling of the bundled articles.

Still another object of the invention is to provide a wire-tying machine such as characterized above, which is automatic in operation, and which is of relatively simple construction and incorporates a single fluid cylinder.

In the drawings:

FIG. 9 is a sectional view on line 9—9 of FIG. 5;

FIG. 10 is a fragmentary elevational view, partially in section, and illustrating one stage of the operation of the machine;

FIG. 11 is a fragmentary side elevation of the machine showing the side thereof remote from that shown in FIG. 1;

FIG. 12 is a view similar to FIG. 11 and on a somewhat enlarged scale;

FIG. 13 is a view on a still larger scale taken at right angles to FIG. 12 and further illustrating certain elements shown in the last-mentioned view;

FIG. 14 is a wiring diagram;

FIG. 15 is a fluid diagram;

FIG. 16 is a view of a completed wire wrap or tie effected by the machine;

FIG. 17 is a perspective view on a larger scale illustrating a ratchet-like part incorporated in the machine;

FIG. 19 is a fragmentary view illustrating one of the tie wires at one stage of the tying operation.

Figure 1:
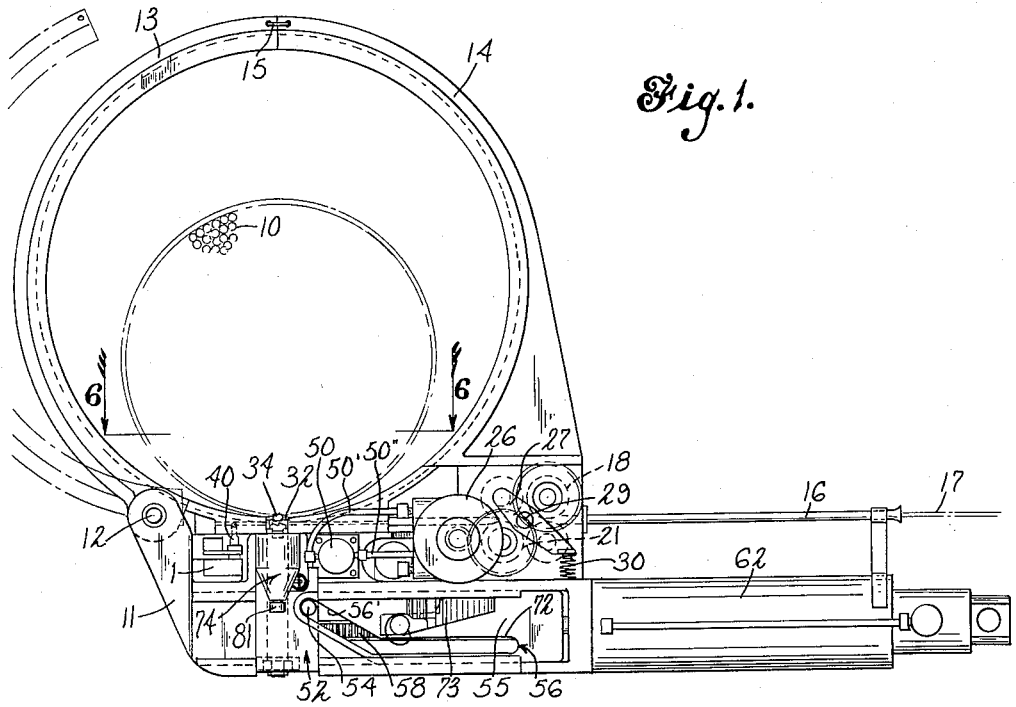
FIG. 1 is a side elevational view of a wire-tying machine embodying the invention and illustrating the same in association with a plurality of rods to be tied in a bundle.
Figures 2, 3:
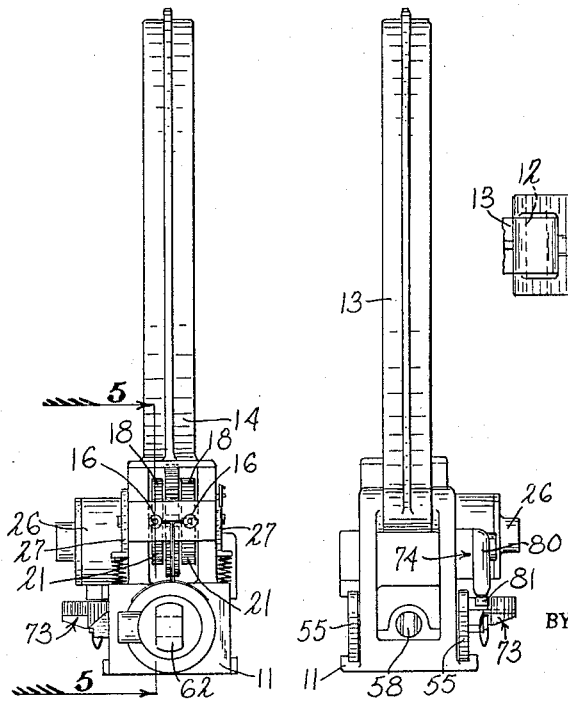
FIGS. 2 and 3 are end elevational views of the machine looking from the right and left of FIG. 1, respectively.

As previously indicated, the machine may be employed to tie into a bundle a plurality (see FIG. 1) of rods 10. The machine includes a main frame 11 on which is pivoted, as at 12, a wire guiding yoke member 13 swingable in a vertical plane toward and away from a cooperating yoke member 14 rigidly mounted on the frame. When in their operative positions the yoke members 13, 14 abut one another and are locked together, as at 15, to form a circular wire guide for embracing the articles to be bundled. The member 13 may be unlocked from the member 14 and swung away from the latter to permit the insertion and removal of certain articles which may be tied together in a bundle by the machine. It may be noted here that the machine may be employed in an upright position, as shown, or may be used horizontally, on its side, or in an inverted position. Furthermore, the machine may be placed on a movable support, if desired.

In the illustrated form, the machine simultaneously received two tie wires 17 to simultaneously form two separate wraps or ties around the bundle. The wires 17 are delivered from suitable supply coils, not shown, and pass through tubular guides 16 fixed to the frame of the machine.

Figure 5:
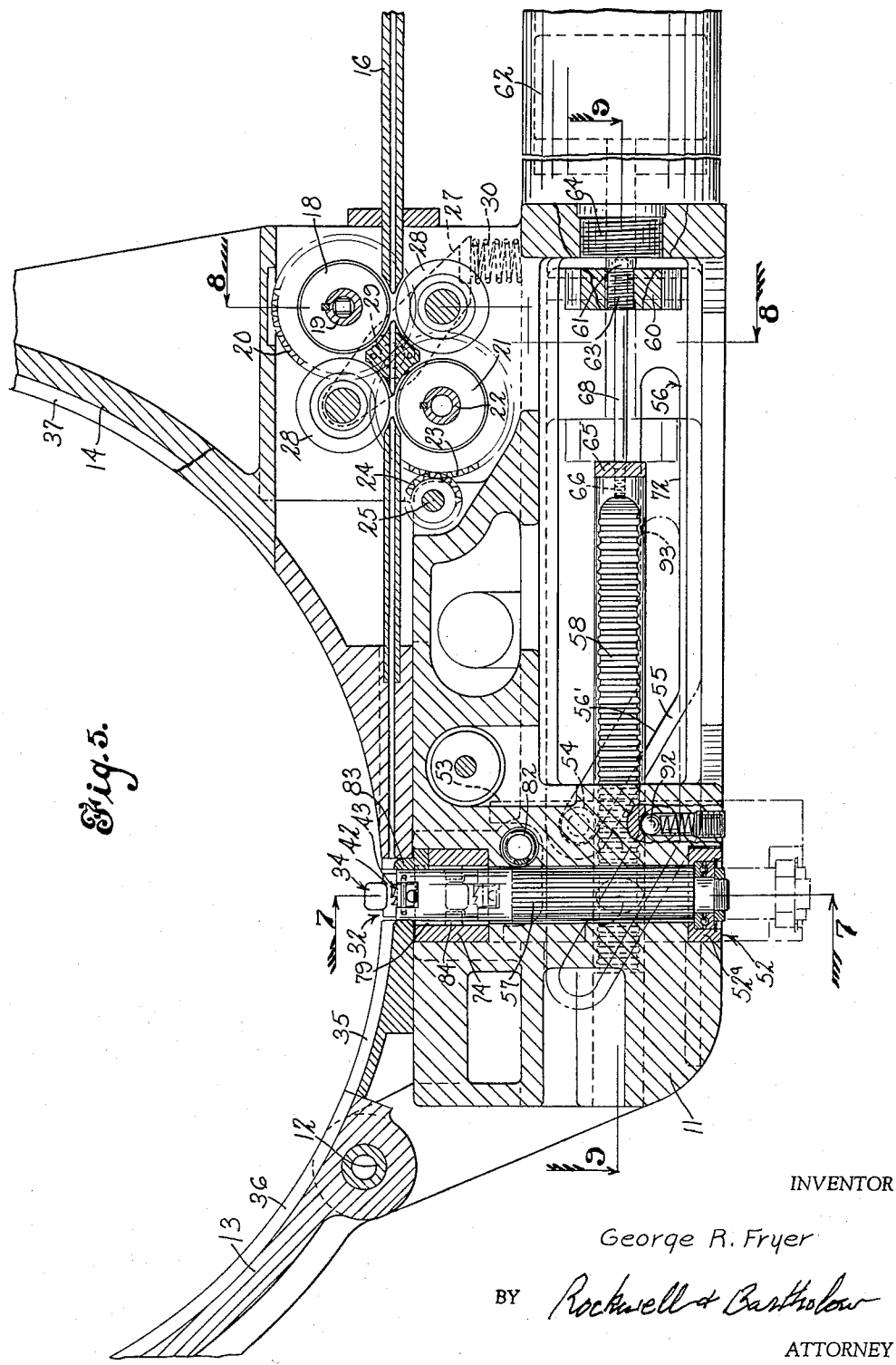
FIG. 5 is an enlarged sectional view on line 5—5 of FIG. 2.

Two feed rolls 18 are fixed on a shaft 19 suitably journaled in the frame, the rolls 18 being axially spaced apart and having therebetween a gear 20 also fixed on the shaft 19. Two identical feed rolls 21 are fixed on a shaft 22, also journaled in the frame, the feed rolls 21 being axially spaced apart and having therebetween a gear 23 fixed to the last-mentioned shaft and meshing with the gear 20. The gear 23 is driven from a gear 24 on the shaft 25 of an air motor 26. The arrangement is such that the feed rolls 18 are rotated in a direction opposite the direction of rotation of the feed rolls 21. As indicated in FIG. 5, the feed rolls 18 are in staggered relation to the feed rolls 21, the rolls 18 being disposed above the run of the wire and the rolls 21 being disposed below the run of the wire. Two rocker arms 27 are provided, each carrying two idler rolls 28, the rolls 28 being disposed at the respective ends of the corresponding arms. The arms 27 are pivoted to the frame at opposite sides thereof, as at 29. The idler rolls 28 of each pair are disposed at opposite sides of the run of the wire and the corresponding arms 27 are urged by springs 30 to press the wire against the feed rolls 18, 21. It will be understood that each wire 17 is fed by one roll 18 and one roll 21. The feed rolls 18, 21 may be roughened, as shown, to provide traction with the wire. The wire is fed tangentially to an interruption 32 in the arcuately formed yoke member 14.

A pair of vertically arranged and upwardly slidable twisters 34 are mounted in laterally spaced apart relation in the frame 11 to cooperate with the respective wires 17, the twisters being extensible in an upward direction to occupy the interruption or opening 32 in the wire guide member 14. The construction and arrangement of the twisters 34 will appear in detail hereinafter. The wires 17 are fed forwardly through the respective twisters 34 by the feed rolls 18, 21 and beyond the twisters, the wire guide member 14 is provided with two laterally spaced apart channels 35 to receive the respective wires 17 and guide them into axially aligned channels 36 formed in the guide member 13. The wire-receiving channels 36 in the member 13 extend upwardly to the top of the latter and register with downwardly extending wire-receiving channels 37 formed in the guide member 14. In this manner the wire 17 may be fed through the wire-guiding yoke members 13, 14 to completely encircle the rods 10 which are to be tied into a bundle.

In the illustrated form, the tie wires 17 are looped only once around the articles which are to be tied together in a bundle. However, this is a matter of choice. In the present instance, each wire 17 issues from the corresponding channel 37 into the corresponding twister 34 and then into a dead-end channel 38 formed in the member 14 alongside the corresponding channel 35. Each channel 38 is of rather short dimension and adjacent the dead-end thereof receives a trip 40 which is operated by the corresponding wire 17 to reverse the direction of the air motor 26 and the feed rolls 18, 21.

The effect of the reversal of the feed rolls 18, 21 will appear hereinafter.

From the foregoing it will be understood that the operation of the air motor 26 to feed the wires 17 in a forward direction effects passage of each wire 17 through each twister 34, not once, but twice. Each twister 34, which is generally of rod form (see FIG. 7), has at its upper end portion a wire-receiving recess 42 formed in the side thereof. A ratchet-like member 43, best shown in FIG. 17, having trunnions 45, is loosely mounted in each twister 34 to extend into the recess 42 and, as shown in the last-mentioned view, is of asymmetrical form. One side of the ratchet-like member is smooth, as at 46, while the other side of the last-mentioned member is serrated or toothed, as at 47. The toothed side of the ratchet-like member is separated from the smooth side by a divider 48. Each member 43 cooperates with one tie wire 17 and is urged upwardly in the aforementioned recess 42 by a suitable spring 49. The arrangement is such that when each wire 17 first passes through the corresponding twister 34 the wire is extended over the smooth side 46 of the corresponding member 43 but when it is passed through the twister a second time, that is from the channel 37, it is extended over the toothed side 47. When the wires 17 are fed forwardly they slide easily over the toothed sides 47 of the ratchet-like members. Thus it will be understood that when the air motor 26 is reversed in the aforementioned manner to reverse the drive of the feed rolls 18, 21, retraction of the end of each wire 17 is prevented by the gripping or wedging of the wire between the toothed side of the corresponding ratchet-like member 43 and the upper extremity of the corresponding wire-receiving recess 42.

It will be understood that when the feed rolls 18, 21 are driven in a direction to feed back or retract the wires 17, the loop formed by each wire 17 and extending around the circular guide is shortened and consequently is pulled out of the guide members 13, 14 and wrapped snugly around the rods 10. The amount of feedback is controlled by a conventional adjustable pressure switch 50 operated by the air motor 26 and having air connections 50' and 50" to the motor. The arrangement is such that, when the wires 17 are retracted a distance sufficiently to wrap themselves closely around the rods 10, the rods, formed in a bundle, offer resistance to further retraction of the wires and consequently an increase in air pressure is effected by the motor 26. This increase in pressure serves to operate the pressure switch which, in turn, stops the reversing action of the air motor 26 and effects operation of the motor in a direction to feed the wire forwardly once again. This second forward feeding action of the rolls 18, 21 (which is limited by adjustable switch 26ᵃ to be described hereinafter) effects sufficient slack in the wires to permit subsequent lowering of the twisters 34 in the frame, the lower portion being shown in broken lines in FIG. 5. This lowering movement (brought about in a manner to be described hereinafter) effects a U-shaped bend in each wire 17 as the wire is pulled down into the opening 32. One of the wires 17 is shown at this stage in FIG. 19, the U-shaped bends being indicated as 17' and 17".

Figure 7:
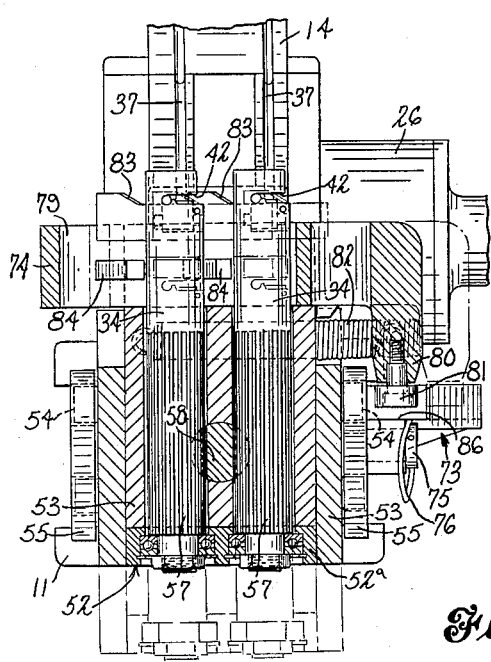
FIG. 7 is a sectional view on line 7—7 of FIG. 5.

The construction and arrangement of the twisters will now be explained in more detail. As previously pointed out, the twisters 34, which are generally of rod form, are arranged in the frame 11 for vertical sliding movement. As shown in FIG. 7, the lower ends of the twisters 34 are laterally spaced apart and journaled in axially fixed position in a cross member 52ᵃ of a U-shaped vertically movable slide 52 having sides 53 straddling and slidable up and down on a portion of the main frame 11. Each side 53 of the slide is provided at the upper part thereof with a laterally outwardly extending cam follower 54 in the form of a cylindrical stud. Two cam plates 55 are provided overlying the respective sides 53 of the slide and each having an angular cam track or opening 56 therein for receiving one of the cam followers 54. The cam plates 55 are suitably mounted on the main frame 11 for sliding movement in a horizontal direction or a direction at right angles to the axes of the twisters 34. The arrangement is such that when the cam plates 55 are slidingly moved in a forward direction, that is, from the full-line position of FIG. 5 to the broken-line position of FIG. 5, the twisters 34 are lowered in the frame 11 through the action of the cam plates 55 on the cam followers 54. The manner in which the cam plates 55 are moved will appear hereinafter.

Figure 4:
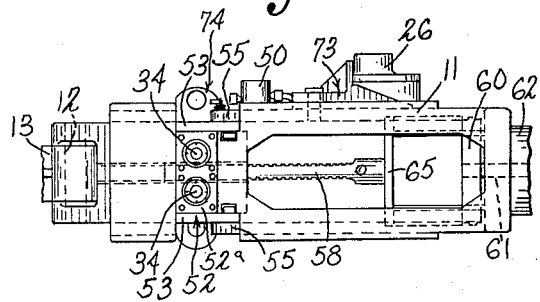
FIG. 4 is a fragmentary bottom view of the machine.
Figure 8:
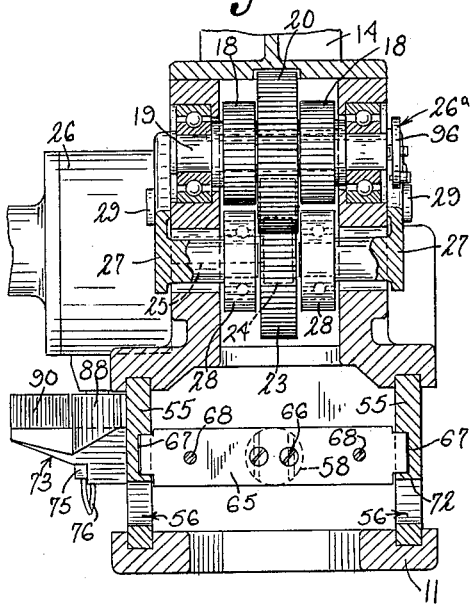
FIG. 8 is a sectional view on line 8—8 of FIG. 5.
Figure 18:
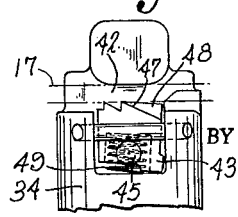
FIG. 18 is an enlarged fragmentary view of one of the twisters.

Each twister 34 is splined, as at 57, for cooperation with a horizontally movable double-edge rack 58 mounted in the frame and extending between the twisters. The twisters 34, while being vertically slidable with respect to the rack bar 58, have rotary motion imparted to them by the rack 58 when the latter is advanced, that is to say, moved to the left as viewed in FIG. 4. At their rear ends the cam plates 55 are rigidly interconnected by a tie plate 60, as shown in FIG. 9. As shown in the last-mentioned view, the piston rod 61 of an air cylinder 62 has the outer end thereof threaded into the mid-portion of the tie bar 60, as at 63, the arrangement being such that the cam plates 55 are moved forwardly on extension of the piston rod from the cylinder 62 and moved rearwardly on retraction of the piston rod. As shown in FIG. 9, the end of the cylinder 62 from which the piston rod 61 is extensible is threaded into the frame, as at 64, for support by the latter. The rack 58 has at its rear end a crosshead 65 extending between the cam plates 55 and secured to the rack by suitable fasteners 66, as shown in FIG. 9. As shown in FIG. 8, the cam plates 55 are provided with grooves 67 into which the crosshead extends, the arrangement being such that the crosshead is relatively slidably forwardly and rearwardly in the grooves 67. As shown in FIG. 9, the crosshead 65 is provided with two laterally spaced-apart and rearwardly extending stop members 68 of rod-like form, each stop member having one end thereof threaded into the crosshead, as at 69. The stop members 68 are freely extensible through apertures 70 formed in the tie plate 60 and the distal ends of the rod-like stop members 68 are engageable with the frame to limit rearward movement of the crosshead 65 and the rack 58.

The cam plates 55 are shown in their rearmost position in FIG. 9 and when the plates 55 are in this position the crosshead 65 is spaced forwardly from the tie plate 60 and the stop members 68 are engaged with the frame. When the crosshead is in this position it occupies the forward extremities of the slots 67 in the plates 55 and thus forward movement of the crosshead and the rack independently of the cam plates 55 is prevented. It will be understood from the foregoing that the arrangement is such that when the piston rod 61 is extended from the cylinder 62 the cam plates 55 are first moved forwardly independently of the crosshead 65 through movement of the tie plate 60. During this initial movement of the cam plates 55, the crosshead 65 extending into the grooves 67 in the plates 55, moves rearwardly relatively to the plates 55, and it is during this initial movement that the cam plates 55 effect lowering of the twisters 34 through the cam followers 54. The twisters 34 are lowered to the broken-line position of FIG. 5 before the crosshead 65 is impinged by the tie plate 60, and hence there is no angular or rotary movement imparted to the twisters by the rack prior to the lowering of the twisters. When the crosshead 65 is impinged by the tie plate 60 the crosshead and rack are moved forward by continuing forward movement of the tie plate 60 from the broken-line position of FIG. 5.

The cam plates 55, together with the rack 58, are moved forwardly from the broken-line position of FIG. 5 to the broken-line position of FIG. 10 and during this movement the twisters 34 are rotated through approximately two or three complete revolutions to twist each wire 17 thus tightening the wire around the bundled rods 10. The twist in the wire shown in FIG. 16 is typical. It will be understood that as the twisters are rotated by the rack the twisters are maintained in their lower position by the sliding movement of each cam follower 54 along a horizontal portion 72 of the cam track formed in the plates 55. During the twisting operation each wire 17 is held firmly in the wire-receiving recess 42 of the corresponding twister and the twist is formed between the upper end of the twister and the rods 10. Thus a double loop is formed at the lower end of each tie, the double loop being shown in the tie illustrated in FIG. 16. Carried by one of the cam plates 55 is a cam member 73 for operating a combined cutter and stripper element 74 which cuts the completed ties loose from the wire supply and strips the ties from the twisters 34.

Figure 6:
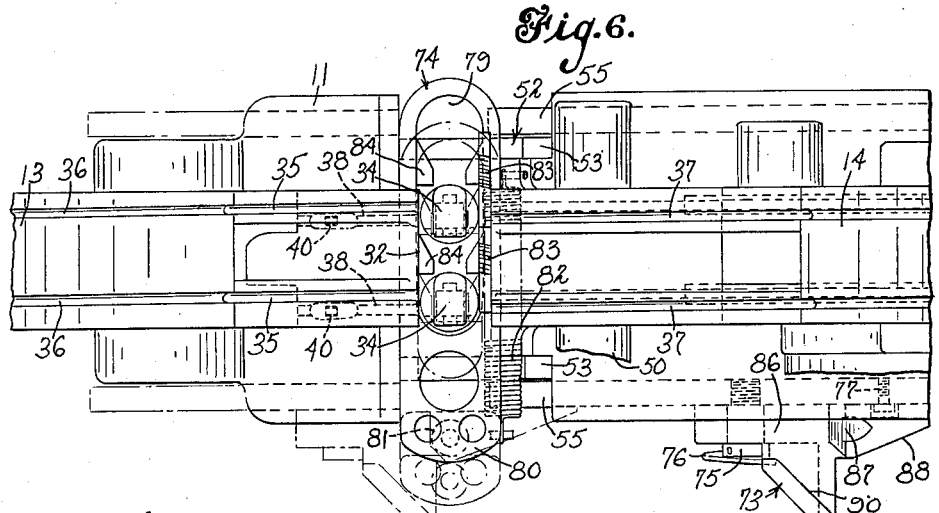
FIG. 6 is a fragmentary plan view looking in the direction indicated by the arrows 6—6 of FIG. 1.

The cam member 73, best shown in FIGS. 6, 7 and 8, is pivoted, as at 75, on the last-mentioned cam plate 55, the member 73 being swingable in a vertical plane and being urged upwardly by a spring 76. A fixed stop 77, carried by the last-mentioned cam plate 55 and protruding laterally outwardly therefrom, cooperates with the member 73 to limit upward swinging movement of the latter. The combined cutter and stripper element 74 is elongated transversely of the machine and is mounted in the frame 11 for lengthwise sliding movement, the element 74 having a vertical opening 79 through which the twisters 34 extend. At the end thereof nearest the cam member 73 the cutter and stripper is provided with an integrally formed depending part 80 carrying at the lower extremity thereof a roller 81 mounted on a vertical axis for cooperation with the cam member 73. The cutter and stripper element is shown in its normal or inoperative position in FIG. 7 and, as viewed in FIG. 7, is moved to the right to cut and strip. The element 74 is moved to the right by the action of the cam member 73 and is pulled to the left by a suitable tension spring 82. As shown in the last-mentioned view, a pair of knife elements 83 are provided on the combined cutter and stripper element to cut the respective wires 17 when the element is moved to the right. As best shown in FIG. 6, two pairs of stripper elements 84 are provided on the element 74, each pair serving to strip one completed wire tie from one of the twisters 34 after the tie has been cut loose from the wire supply by the corresponding knife element 83 as the element is moved by the cam member 73 from the full-line position of FIG. 6 to the broken-line position of the same.

As shown in FIG. 6 in full lines, the cam member 73, when the cam plates 55 are in their rearmost position, is spaced rearwardly from the cutter and stripper element 74. When and as the cam plates 55 and the rack 58 are moved forwardly to effect a twist in each wire 17, the roller 81 of the element 74, as the cam member 73 moves toward it, enters with clearance an upwardly opening recess 86 formed in a portion of the upper surface of the member 73 and then strikes a rise 87 provided on the last-mentioned member. Impingement of the roller 81 with the rise 87 causes the cam member 73 to swing downwardly against the pressure of the spring 76 so that the cam member rides under the roller 81. However, when the cam plates 55 are moved rearwardly by retraction of the piston rod 61 (brought about in a manner which will appear hereinafter), the cam member 73, which has completely cleared the roller 81 and returned to its raised position, strikes the roller on the inclined surface 88 of the cam member which forces the roller and the cutter and stripper element 74 in a direction to first cut the wire 17 and then strip the completed ties from the twisters 34. This movement of the element is indicated in broken-lines in FIG. 6. Continued rearward movement of the cam plates 55 effects re-entry of the roller 81 into the aforementioned recess 86 in the member 73 to strike an inclined wall 90 which forces the roller in a direction to return the cutter and stripper element to its inoperative position. In other words, impingement of the roller by the wall 90 facilitates the return of the cutter and stripper element by the spring 82. The roller 81 leaves the cam member 73 as the latter is carried rearwardly by the rearward motion of the cam plates 55. As the cam plates 55 are moved rearwardly by retraction of the piston rod 61, the plates pick up the crosshead 65 of the rack 58 in the forward extremities of the slots 67 and carry the rack to the rearmost position of the same, shown in FIG. 9.

As previously pointed out, the stop members 68, carried by the cross head 65 and engageable with the frame 10, serve to limit rearward movement of the crosshead and rack. A ball detent 92 (FIG. 5) may be provided to cooperate with suitable recesses 93 formed in the bottom of the rack to limit movement of the latter, especially when the tying machine is used in positions other than the position of FIG. 1. It will be understood that as the cam plates 55 are returned to their rearmost positions, the cam followers 54 riding in the tracks 56 of the plates are forced upwardly by the forward upwardly inclined portions 56' of the tracks so that the twisters 34 are returned to their raised position. At the completion of the above-described cycle of the wire-tying machine, the tied bundle may be advanced in the machine and the cycle repeated to place more wire ties around the bundle, or the bundle may be removed from the machine.

Turning now to the details of some of the machine controls mentioned above, the switch 26$^a$, which governs the second forward feeding of the wires in each tying cycle and effects sufficient slack in the wires to permit lowering of the twisters, is provided (FIG. 12) with a two-position throw member 95 of the plunger type, having a wheel thereon cooperating with a cam disc 96. The cam disc 96 is driven frictionally from the shaft 19 angularly rigid with the feed rolls 18. As indicated in FIG. 13, the shaft 19 is hollow and frictionally receives an expansion spring 97 rigid with the axis of the disc 96. To stop or limit the extent of rotation of the disc 96 during rotation of the feed rolls 18, a fixed stop 98 and a movable stop 99 are provided on the disc to cooperate with a stop member 101 fixed to the frame. As shown in FIG. 12, the greater part of the circumference of the cam disc 96 is formed on a single radius and is indicated at 103, and a small part of the circumference is recessed, as at 102. The fixed stop 98 on the cam disc is located adjacent one end of the part 103 and a plurality of circumferentially spaced apertures 104 are formed in the disc 96 to cooperate with the movable stop 99, the apertures 104 extending from a point a short distance from the fixed stop 98 to a point adjacent the other end of the part 103, as shown in FIG. 12. As shown in FIG. 13, the stop 99 is mounted on a spring arm 99$^a$ pivoted on the axis of the disc 96. The stop 99 has a pin-like projection 99$^b$ which may project through any one of the apertures 104 in the disc, the arrangement being such that the stop 99 may be moved selectively circumferentially of the cam in a direction toward or away from the fixed stop 98. It will be understood that the spring arm 99$^a$ urges the stop 99 in a direction to project the part 99$^b$ thereof through the selected aperture 104. To adjust the stop 99, the latter may be grasped when in the full-line position of FIG. 13 and pulled in a direction to remove the part 99$^b$ from the registering hole, that is, to the broken-line position of the last-mentioned figure. The stop 99 may then be swung on the axis of the disc 96 to register with any of the other holes 104.

The cooperation of the follower or throw member 95 with the cam disc 96 is as follows. When the wires 17 are first fed forwardly in the wire-tying machine, the cam disc 96 may rotate in the direction of the arrow in FIG. 12, the disc rotating with the shaft 19 fixed to the feed rolls 18. However, the cam disc may rotate in this direction only until the fixed stop 98 strikes and comes to rest against the fixed stop member 101, as indicated in the last-mentioned view. When the direction of the feed is reversed, the disc 96 rotates in the opposite direction but rotates in this direction only until the stop 99 strikes and comes to rest against the fixed stop member 101, as shown in FIG. 12. When the stop 99 is engaged with the stop member 101 the throw member 95 is engaged with the part 103 of the cam disc. The cam disc is then in a position to limit the second forward feeding action of the rolls 18.

As previously described, the pressure switch 50 initiates the second forward feeding of the wires 17 by the rolls 18. When the second forward feeding action of the rolls 18 is commenced the disc 96 rotates with the shaft 19 in a direction opposite to the direction shown by the arrow in FIG. 12. The cam disc is rotated in the last-mentioned direction until the throw member 95 enters the recessed part 102 in the disc. This movement of the throw member 95 terminates the second forward feeding action of the rolls 18 by the air motor 26. In other words, when the throw member 95, which is spring urged in a direction toward the center of the disc, enters the recess 102, the switch 26ª shuts off the air motor. From the foregoing it will be understood that the second forward feeding action of the rolls 18 may be increased or shortened by adjusting the stop member 99 respectively toward or away from the fixed stop 98.

The stop 99 is adjusted in accordance with the compressibility of the articles which are being bundled. As previously pointed out, the second forward feeding action of the rolls 18 advances the wires 17 only to the extent that the twisters 34 may be lowered in the frame and rotated to perform the twisting operation without undue tension and resulting breakage of the wires. Hence it will be understood that if the articles which are being bundled are very compressible little or no forward feeding of the wires 17 is necessary after the feedback, that is to say, that the articles to be bundled are only further compressed by the movement of the twisters 34 to their lower position. However, when the articles which are being bundled are relatively incompressible a second forward feeding of the wires 17 is necessary to prevent breakage of the wires when the twisters are lowered in the frame and then rotated to twist the wires.

As indicated in the wiring diagram (see FIG. 14), a suitable push-button switch may be employed to initiate the wire-tying cycle. However, if desired, a switch which is actuated by the weight of the articles to be bundled may be employed instead of the push-button switch. As indicated in the wiring diagram of FIG. 14, the push button may be momentarily depressed to energize relay 1CR and thereby close contacts 1cr. When the last-mentioned contacts are closed a circuit is completed energizing solenoid A to move a three-position valve (see FIG. 15) in a direction to admit air to the air motor from the air supply, the air being admitted in a direction to drive the air motor forwardly to advance each wire in the tying machine, the wire being advanced by the feed rolls driven from the air motor. When the advancing wire strikes trip 40 the latter operates switch 1 to open the circuit to solenoid A and close the circuit to solenoid B. Solenoid B moves the aforementioned three-position valve in a direction to reverse the air motor and thereby reverse the direction of the wire in the machine.

From the foregoing it will be understood that when the solenoid A is energized the air motor is driven in a direction to advance the wire, while the solenoid B, which is energized only after solenoid A is de-energized, effects reverse rotation of the air motor to feed back or retract the wire in the machine. When the wire is tightened around the articles to be bundled and there is a resultant increase in the air pressure, the pressure switch 50 is operated breaking the circuit to relay 1CR and establishing a circuit to relay 2CR. When the last-mentioned relay is energized contacts 2cr are closed and a circuit is established to solenoid A through the cam switch 26ª. Re-energization of solenoid A effects the second forward feeding of the wire in the machine. The wire is thus fed forwardly in the machine until the throw member 95 of the switch 26ª enters the recessed part 102 of the cooperating cam disc. When this occurs the switch 26ª breaks the circuit to solenoid A (terminating the advance of the wire in the machine) and establishes a circuit to solenoid C which moves a two-position valve to direct air to the twister cylinder from the air supply in a direction to extend the piston rod from the cylinder.

As mentioned above, extension of the piston rod from the twister cylinder effects forward movement of the cam plates 55 and the twister rack 58. At the end of its forward stroke the rack engages and opens switch 105 thereby breaking the circuit to relay 2CR which in turn breaks the circuit to solenoid C. The switch 105, which is spring biased to the closed position thereof, closes upon disengagement with and rearward movement of the rack. When solenoid C is de-energized the aforementioned two-position valve is returned to its initial position and, when in this position, air is supplied to the twister cylinder to return the piston rod to its retracted position. The retraction of the piston rod effects the return of the cam plates 55 and the rack 58 to their initial positions.

From the foregoing disclosure it will be manifest that there is provided a wire-tying machine which is automatic in operation and which is of relatively simple construction and incorporates a single fluid cylinder. Though automatic, the machine is portable and may be easily transported from place to place. Furthermore, the machine may effect a plurality of simultaneous wire ties. Another advantage of the machine is that it produces a wire tie in which the twisted end portions thereof are looped so as not to catch on hands or foreign articles during handling of the tied articles.

While only one form of the wire-tying machine has been illustrated in the drawings and described above, it will be understood that the machine is susceptible of various changes and modifications of details without departing from the principles of the invention and the scope of the appended claims.

What I claim is:

1. In a wire-tying machine, a support for supporting a tie wire in loop formation around a plurality of articles to be bundled, wire-feeding means for feeding a free end of a tie wire forwardly from a source of supply to the support to encircle the articles, and for feeding the wire rearwardly to draw it snugly around the articles, said support being provided with an interruption, twisting means in said interruption and through which the wire is fed forwardly to form a loop with the free end portion of the wire overlapping a portion of the wire extending from the wire supply, the twisting means being disposed in said interruption for sliding movement lengthwise of its twisting axis and generally radially of the loop, the last-mentioned means being slidable between an outer wire-receiving position and an inner wire-tensioning-and-twisting position, means for sliding said twisting means including a motor-operated element movably mounted on the support and having an operative connection to the twisting means and which on movement in one direction is effective to lower the twisting means to the inner wire-tensioning-and-twisting position, after the wire has been fed through the twisting means and then fed rearwardly to draw it snugly around the articles, prior to the twisting operation, means operable by said element, which on continued movement of the latter in the last-mentioned direction effects operation of the twisting means, and means for cutting and stripping the tie wire.

2. In a wire-tying machine, a support for supporting a tie wire in loop formation around a plurality of articles to be bundled, wire-feeding means for feeding a free end of a tie wire forwardly from a source of supply to the support to encircle the articles, and for feeding the wire rearwardly to draw it snugly around the articles, said support being provided with an interruption, twisting means in said interruption and through which the wire is fed forwardly to form a loop with the free end portion of the wire overlapping a portion of the wire extending from the wire supply, the twisting means being disposed in said interruption for sliding movement lengthwise of its twisting axis and generally radially of the loop, the last-mentioned means being slidable between an outer wire-receiving position and an inner wire-tensioning-and-twisting position, means for sliding said twisting means including a motor-operated element movably mounted on the support and having an operative connection to the twisting means and which on movement in one direction is effective to lower the twisting means to the inner wire-tensioning-and-twisting position, after the wire has been fed through the twisting means and then fed rearwardly to draw it snugly around the articles, prior to the twisting operation, means operable by said element, which on continued movement of the latter in the last-mentioned direction effects operation of the twisting means, and means for cutting and stripping the tie wire, the last-named means being operable by said element on movement of the latter in the opposite direction.

3. In a wire-tying machine, a support for supporting a tie wire in loop formation around a plurality of articles to be bundled, wire-feeding means for feeding a free end of a tie wire forwardly from a source of supply into said support to encircle the articles and for feeding the wire rearwardly to draw it snugly about the articles, said support being provided with an interruption, a rotary twister of generally rodlike form through which the wire is fed forwardly to form a loop with the free end portion of the wire overlapping a portion of the wire extending from the wire supply, the twister rod being disposed in said interruption for sliding movement lengthwise of its twisting axis and generally radially of the loop, the twister rod being slidable between an outer wire-receiving position and an inner wire-tensioning-and-twisting position, means for sliding said twister rod including a motor-operated element movably mounted on the support and having an operative connection to the twister rod and which on movement in one direction is effective to lower the twister rod to the inner wire-tensioning-and-twisting position after the wire has been fed through the twister rod and then reversed to draw it snugly around the articles to be bundled, prior to the twisting operation, said element being constituted by a fluid-operated piston rod, means operable by said piston rod which on continued movement of the latter in the last-mentioned direction effects rotary operation of the twister rod, and means for cutting and stripping the tie wire.

4. In a wire-tying machine, a support for supporting a tie wire in loop formation around a plurality of articles to be bundled, wire-feeding means for feeding a free end of a tie wire forwardly from a source of supply into said support to encircle the articles and for feeding the wire rearwardly to draw it snugly about the articles, said support being provided with an interruption, a rotary twister of generally rodlike form through which the wire is fed forwardly to form a loop with the free end portion of the wire overlapping a portion of the wire extending from the wire supply, the twister rod being disposed in said interruption for sliding movement lengthwise of its twisting axis and generally radially of the loop, the twister rod being slidable between an outer wire-receiving position and an inner wire-tensioning-and-twisting position, means for sliding said twister rod including a motor-operated element movably mounted on the support and having an operative connection to the twister rod and which on movement in one direction is effective to lower the twister rod to the inner wire-tensioning-and-twisting position after the wire has been fed through the twister rod and then reversed to draw it snugly around the articles to be bundled, prior to the twisting operation, said element being constituted by a fluid-operated piston rod, means operable by said piston rod which on continued movement of the latter in the last-mentioned direction effects rotary operation of the twister rod, and means for cutting and stripping the tie wire, the last-mentioned means being operable by the piston rod on movement of the latter in the opposite direction.

5. In a wire-tying machine, a support for supporting a tie wire in loop formation around a plurality of articles to be bundled, wire-feeding means for feeding a free end of a tie wire forwardly from a source of supply into said support to encircle the articles and for feeding the wire rearwardly to draw it snugly about the articles, said support being provided with an interruption, a rotary twister of generally rodlike form through which the wire is fed forwardly to form a loop with the free end portion of the wire overlapping a portion of the wire extending from the wire supply, the twister rod being disposed in said interruption for sliding movement lengthwise of its twisting axis and generally radially of the loop, the twister rod being provided with a gripper member for gripping the free end portion of the wire and holding it stationary while the loop is drawn snugly around the articles, the twister rod being slidable between an outer wire-receiving position and an inner wire-tensioning-and-twisting position, means for sliding said twister rod including a motor-operated element movably mounted on the support and having an operative connection to the twister rod and which on movement in one direction is effective to lower the twister rod to the inner wire-tensioning-and-twisting position after the wire has been fed through the twister rod and then reversed to draw it snugly around the articles to be bundled, prior to the twisting operation, said element being constituted by a fluid-operated piston rod, means operable by said piston rod which on continued movement of the latter in the last-mentioned direction effects rotary operation of the twister rod, and means for cutting and stripping the tie wire.

6. A wire-tying machine as defined in claim 5, wherein the twister rod is toothed and wherein said means for effecting rotary operation of the twister rod includes a rack engageable with the teeth of the twister rod.

7. A wire-tying machine as defined in claim 6, wherein the means for effecting sliding movement of the twister rod comprises a cam mechanism fixed to said piston rod.

8. A wire-tying machine as defined in claim 7, wherein the means for cutting and stripping the tie wire is operable by the piston rod on movement of the latter in the opposite direction, the last-mentioned means also including a cam-operated slide having its reciprocating axis arranged transversely of the plane of the loop.

9. In a wire-tying machine, a support, wire-feeding means for feeding a free end of a tie wire forwardly from a source of supply to the support so that the wire may be formed in a loop around a plurality of articles to be bundled on the support, twisting means mounted in the support and through which the wire is fed to form a loop with the free end portion of the wire overlapping a portion of the wire extending from the wire supply, the twisting means being mounted in the support for sliding movement lengthwise of its twisting axis and generally radially of the loop, the last-mentioned means being slidable between an outer wire-receiving position and an inner wire-tensioning-and-twisting position, means for sliding said twisting means including a motor-operated element movably mounted on the support and having an operative connection to the twisting means and which on movement in one direction is effective to lower the twisting means to the inner wire-tensioning-and-twisting position after the wire has been fed through the twisting means and the loop formed around the articles to be bundled, prior to the twisting operation, means operable by said element, which on continued movement of the latter in the last-mentioned direction effects operation of the twisting means, and means for cutting and stripping the wire tie.

10. In a wire-tying machine, a support, wire-feeding means for feeding a free end of a tie wire forwardly from a source of supply to the support so that the wire may be formed in a loop around a plurality of articles to be bundled on the support, and for feeding the wire rearwardly to draw it snugly around the articles, twisting means mounted in the support and through which the wire is fed to form a loop with the free end portion of the wire overlapping a portion of the wire extending from the wire supply, the twisting means being mounted in the support for sliding movement lengthwise of its twisting axis and generally radially of the loop, the last-mentioned means being slidable between an outer wire-receiving position and an inner wire-tensioning-and-twisting position, means for sliding said twisting means including a motor-operated element movably mounted from the support and having an operative connection to the twisting means and which on movement in one direction is effective to lower the twisting means to the inner wire-tensioning-and-twisting position after the wire has been fed forwardly through the twisting means and fed rearwardly to draw it snugly around the articles to be bundled, prior to the twisting operation, means operable by said element which on continued movement of the latter in the last-mentioned direction effects operation of the twisting means, and means for cutting and stripping the wire.

11. In a wire-tying machine, a support for supporting a plurality of articles to be bundled, twisting means mounted in the support for sliding movement lengthwise of its twisting axis, the twisting means being slidable between an outer wire-receiving position and an inner wire-tensioning-and-twisting position, wire-feeding means for feeding a free end of a supply wire forwardly from a source of supply to form a loop around the articles and comprising a feed roll, reversible motor-driven means for driving the roll, means controlling the last-mentioned means to feed the wire in a forward direction and pass the wire twice through the twisting means in its outer position and form a loop around the articles with the free end portion of the wire overlapping a portion of the wire extending from the wire supply, control means engageable by the free end of the wire for reversing the motor-driven means to draw the wire snugly around the article, the twisting means having its sliding axis arranged substantially radially of the loop and being provided with a gripper for gripping the free end portion of the wire and holding it stationary while the wire is fed in the last-mentioned direction, pressure-responsive control means for terminating the reversing of the wire, when the wire is snugly around the articles, and effecting a second forward feeding of the wire to permit the twisting means to be moved to the inner twisting position thereof, adjustable cam-operated control means operatively associated with the feed roll for terminating the second forward feeding of the wire, means for sliding said twisting means including a motor-operated element movably mounted on the support and having an operative connection to the twister means and which on movement in one direction is effective to lower the twisting means to the inner wire-tensioning-and-twisting position after the second forward feeding of the wire has been fed through the twisting means and prior to the twisting operation, means operable by said element which on continued movement of the latter in the last-mentioned direction effects operation of the twisting means, and means to cut the wire tie from the wire supply and strip it from the twisting means.

References Cited in the file of this patent

UNITED STATES PATENTS

| 1,357,883 | McChesney | Nov. 2, 1920 |
| 2,339,395 | Harvey | Jan. 18, 1944 |
| 2,742,851 | Fryer | Apr. 24, 1956 |
| 2,749,837 | Hayford | June 12, 1956 |
| 2,880,666 | Rogers | Apr. 7, 1959 |

FOREIGN PATENTS

| 731,288 | Great Britain | June 8, 1955 |